(12) United States Patent
Onel et al.

(10) Patent No.: US 11,740,617 B2
(45) Date of Patent: Aug. 29, 2023

(54) METHODS AND SYSTEMS FOR PERFORMING TRANSIENT PROCESSES

(71) Applicant: ExxonMobil Technology and Engineering Company, Annadale, NJ (US)

(72) Inventors: Onur Onel, Houston, TX (US); Jitendra V. Kadam, Kingwood, TX (US); Apostolos T. Georgiou, Spring, TX (US); Michael G. Tribo, Humble, TX (US); Benjamin J. Ohran, Humble, TX (US); Yunfei Chu, Humble, TX (US); Christopher W. Graham, Kingwood, TX (US); Tyler A. Soderstrom, Houston, TX (US)

(73) Assignee: ExxonMobil Technology and Engineering Company, Annadale, NJ (US)

( * ) Notice: Subject to any disclaimer, the term of this patent is extended or adjusted under 35 U.S.C. 154(b) by 364 days.

(21) Appl. No.: 17/148,697

(22) Filed: Jan. 14, 2021

(65) Prior Publication Data

US 2021/0240175 A1    Aug. 5, 2021

Related U.S. Application Data

(60) Provisional application No. 62/967,747, filed on Jan. 30, 2020.

(51) Int. Cl.
*G05B 23/02* (2006.01)
*B01J 8/04* (2006.01)
*G05B 13/04* (2006.01)

(52) U.S. Cl.
CPC .......... *G05B 23/024* (2013.01); *B01J 8/0496* (2013.01); *G05B 13/042* (2013.01)

(58) Field of Classification Search
CPC ..... G05B 23/024; G05B 13/042; B01J 8/0496
USPC .......................................................... 702/179
See application file for complete search history.

(56) References Cited

U.S. PATENT DOCUMENTS

| | | | |
|---|---|---|---|
| 10,095,200 B2 * | 10/2018 | Horn | C10G 35/24 |
| 2007/0250214 A1 * | 10/2007 | Lee | C08F 10/00 |
| | | | 700/266 |
| 2019/0153331 A1 * | 5/2019 | Barrai | B01J 8/067 |
| 2021/0240175 A1 * | 8/2021 | Onel | B01J 8/0496 |
| 2022/0243133 A1 * | 8/2022 | Sauer | F27D 19/00 |

* cited by examiner

*Primary Examiner* — Aditya S Bhat
(74) *Attorney, Agent, or Firm* — Vorys, Sater, Seymour and Pease LLP (57) ABSTRACT

Methods and systems for performing transient processes may include: providing a path and path thresholds for an operational condition as a function of progress of a transient process based on historical data of previously performed transient processes; performing the transient process in a chemical reactor using operational parameters; measuring the operational condition of the transient process as a function of the progress of the transient process; and adjusting one or more of the operational parameters during the progress of the transient process to maintain the operational condition within the path thresholds.

14 Claims, 6 Drawing Sheets

METHODS AND SYSTEMS FOR PERFORMING TRANSIENT PROCESSES

CROSS REFERENCE TO RELATED APPLICATIONS

This application claims priority to U.S. Provisional Application Ser. No. 62/967,747 filed Jan. 30, 2020, which is herein incorporated by reference in its entirety.

FIELD

This application relates to methods and systems for performing transient processes in petroleum and/or petrochemical processing and/or manufacturing operations.

BACKGROUND

As used herein, a "transient process" refers a process (e.g., a chemical manufacturing to process, a chemical distillation process, a refining process, a petroleum distillation process, petroleum processing methods and the like) in which operating parameters are being changed before, after, or between when the operating parameters are achieved to produce the desired final or intermediate process product. For example, in polymer manufacturing, a first polymer may be produced. Then, without shutting down the reactor, the operational parameters may be changed to produce a second polymer (e.g., the temperature and relative concentration of a monomer and comonomer changed). The chemistry occurring in the reactor during the time between the production of the first and second polymers is a transient process.

Transient processes are more complex than inputting the target operational parameters because reactions occur as the operational parameters are changing. In some instances, the reactions may pose a safety hazard, for example, when flammable reactants are used. In other instances, the products from the reactions may be harmful to the system. For example, the products may foul the reactor or downstream system components and/or deactivate catalysts.

During transient processes, the operational parameters are adjusted to achieve the desired operating conditions. For example, heating units associated with a reactor may be used to increase the temperature in the reactor. Further, for exothermic reactions, a feed rate of a reactant may be increased to increase the temperature in the reactor. In another example with an exothermic reaction, a reactor temperature may be desired to be maintained but the feed rate of reactant is higher, so the heating units may provide less heat while the feed rate is increased. Because of the interrelations between several operational parameters and operating conditions, there are several paths or procedures through which an operating engineer can achieve the desired operating conditions.

Generally, transient processes are implemented based on the operating engineer's experiences. There can be high variability between how each operating engineer approaches the same transient process, especially a start-up transient process. This variability can result in wasted time and expense. Further, the transient process may be ineffective. For example, a start-up transient process may experience an upset where the start-up fails, the reactor has to be shut down again, and the start-up redone.

In some chemical manufacturing processes (e.g., polymer manufacturing), a manufacturing plant may have dozens of reactors that are shut down periodically throughout the year (sometimes 10 times or more a year) for maintenance and cleaning. The reactors then have to undergo a start-up transient process. Additionally, during operation, a single reactor, especially a reactor for smaller-batch custom chemical production, may undergo intermediate transient processes several times to dozens of times between shutdowns as the operating parameters are adjusted between production runs. Accordingly, chemical manufacturing processes are plagued with waste due to transient processes.

SUMMARY

This application relates to methods and systems for performing transient processes. The examples of methods and systems described herein are in connection with performing transient processes in a chemical manufacturing and/or processing facility. The present subject matter, however, is not intended to be so limited. It is contemplated that the methods and systems described herein have application in other processing facilities having transient processes in which operating parameters are being changed before, after, or between when the operating parameters are achieved to produce the desired final or intermediate product.

A method of the present disclosure comprises: providing a path and path thresholds for an operational condition as a function of progress of a transient process based on historical data of previously performed transient processes; performing the transient process in a reactor using operational parameters; measuring the operational condition of the transient process as a function of the progress of the transient process; and adjusting one or more of the operational parameters during the progress of the transient process to maintain the operational condition within the path thresholds.

A computing device of the present disclosure comprises: a processor; a memory coupled to the processor; and instructions provided to the memory, wherein the instructions are executable by the processor to perform the foregoing method.

BRIEF DESCRIPTION OF THE DRAWINGS

The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION

Figure 1:
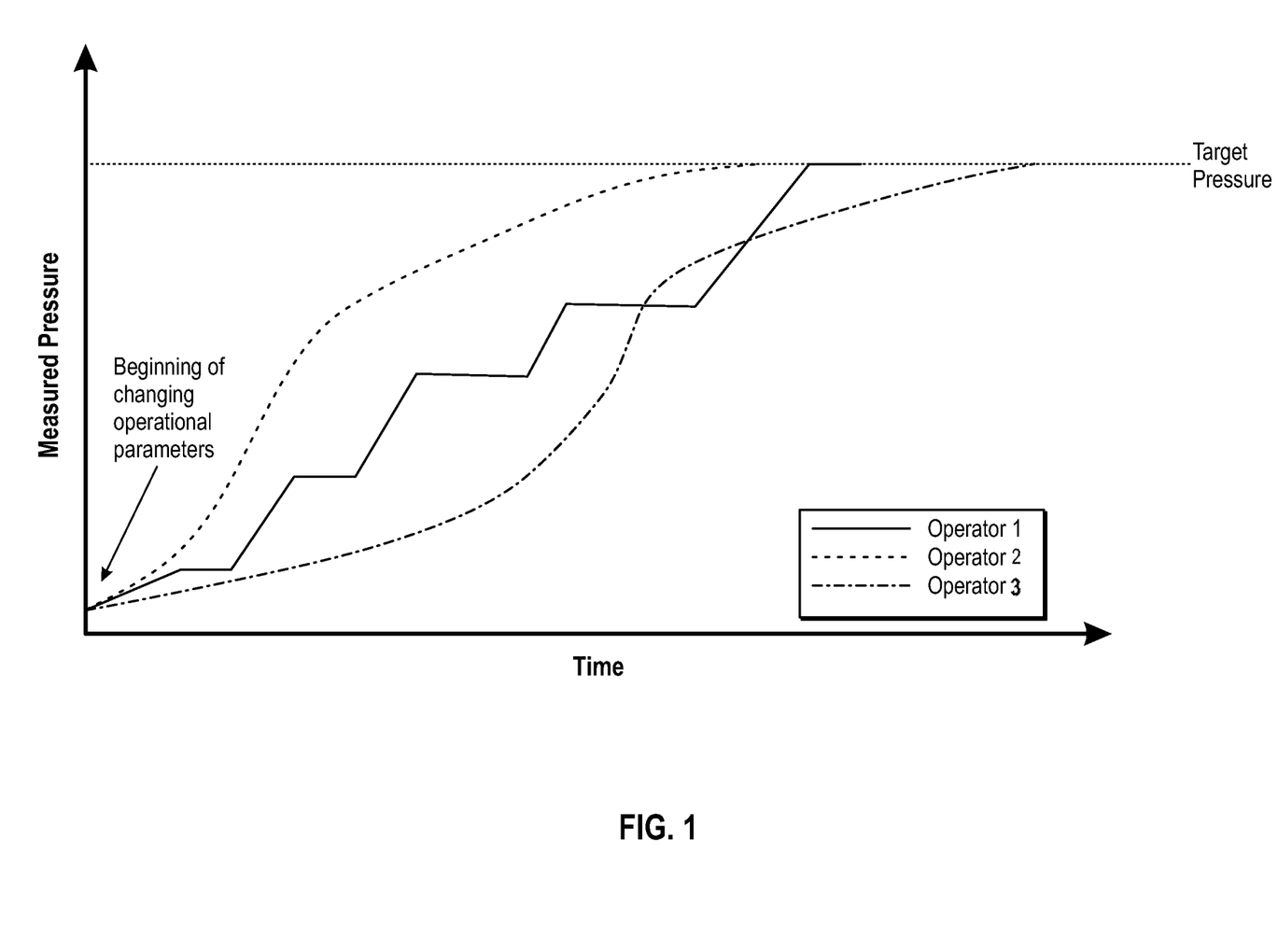
FIG. 1 is a hypothetical example of the pressure measurements during a transient process performed by three different operators based on their experiences and preferences for performing said process.

As described above, transient processes are generally implemented based on the operating engineer's experiences with high variability between how each operating engineer approaches the same transient process. For example, if an operational condition like pressure were measured over time for the same transient process performed by three different engineers, the plots would likely not be similar. FIG. 1 is a hypothetical example of such a scenario. Operator 1 takes a step-wise approach to increasing pressure, and Operators 2 and 3 take approaches with fast and gradual but continuous pressure ramping but Operator 2 implements the fast ramping before Operator 3.

The methods and systems described herein interrelate the operational conditions to provide recommended paths with corresponding thresholds for how individual operational parameters should change through the progress of the transient process. This provides a guide to the operator who may change operational parameters to maintain the real-time measured operation conditions within the thresholds. Such methods and systems advantageously have real-time benchmarking (comparison of the proposed path/thresholds with real-time measurements) that guide the operator to mitigate upsets and more efficiently perform the transient process.

Further, the methods and systems described herein may be adaptive where the recommend path with corresponding thresholds for individual operational conditions changes based on the current measurements of the various operational conditions and the interrelations between operational conditions. This too reduces upsets because the methods and systems can correct for deviations from the path of one or more operational conditions.

As used herein, the term "operational condition" refers to a parameter of a process that can be a measured or value derived from a measurement. Examples of operational conditions of a process include, but are not limited to, temperature, pressure, concentration of a chemical (e.g., a reactant, an intermediate, a catalyst, a solvent, a diluent, a product, a byproduct, and the like), a physical property (e.g., a glass transition temperature, a molecular weight, a density, and the like) of a chemical, a dew point, a flow rate, an injection rate of a chemical, a reaction rate, a change or rate of change in any of the foregoing (e.g., a change in temperature), and the like, and any combination thereof. Operational conditions can be measured or derived from measurements.

Operational parameters are adjusted to effect changes in the operational conditions. One skilled in the art will recognize the operational parameters involved with a specific process and how said operational parameters interrelate.

Examples of processes to which the methods and systems described herein can be applied include, but are not limited to, polymer manufacturing (e.g., polyethylene manufacturing, polypropylene manufacturing, ethylene vinyl acetate manufacturing, and the like), chemical manufacturing (e.g., olefins manufacturing, aromatics manufacturing), petroleum processing and refining and the like, and any combination thereof.

In the methods and systems described herein, operational conditions are monitored in real-time as a function of the progress of the transient process. The operational conditions may have target values and corresponding thresholds as a function of the progress of the transient process, which are referred to herein as a path (or operational condition path) and path thresholds, respectively. The transient process may be broken into two or more stages where each stage has a corresponding sub-path with sub-path thresholds. Herein, referring to transient processes, paths, and path thresholds encompasses embodiments where the transient process comprises two or more stages where each stage has a corresponding sub-path with sub-path thresholds.

The progress of the transient process may be time and/or vessel cycles. Herein, "vessel cycles" refers to the number of times a vessel has cycled a full vessel volume, which is the residence time divided by the time. For example, if a transient process in a polymer synthesis reactor is being monitored and the residence time in the reactor is 10 minutes, then 30 minutes into the transient process is 3 vessel cycles.

Paths and path thresholds for the operational conditions of a transient process are based on data from previous transient processes (also referred to herein as historical data). For example, the path and path thresholds may be based solely on a single previous transient process where the best performance was observed. Alternatively, the path and path thresholds may be based on a statistical analysis of several previous transient processes.

Generally, the historical data for determining the paths and path thresholds for the operational conditions of a transient process is from the same or similar transient processes. While one skilled in the art will recognize what historical data is applicable to the transient process being investigated, it is preferred that each of the starting conditions and ending conditions of the transient process that is the basis of the historical data be within a certain adaptive and statistical threshold (e.g., standard deviation or a fixed percentage threshold (e.g., ±20%)) of the starting conditions and ending conditions of the transient process being investigated.

The historical data is analyzed to derive correlations between the operating conditions, optionally between operating conditions and energy consumption, and optionally between operating conditions and time. These correlations are then the basis of an adaptive model that derives the paths and path thresholds for the operational conditions of a transient process. Further, the adaptive model may also be updated using additional data collected.

Figure 2:
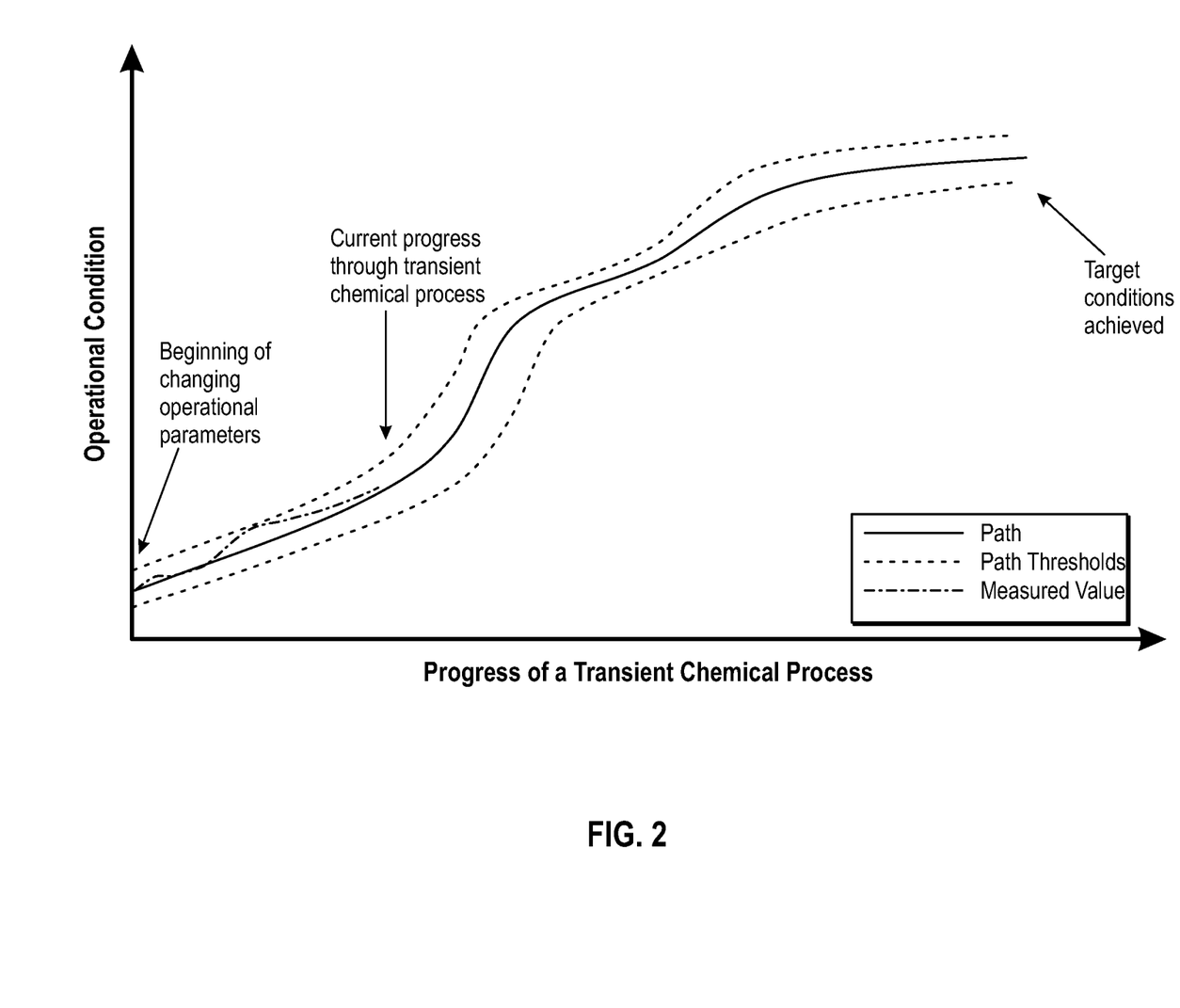
FIG. 2 illustrates a hypothetical plot of (a) measurements of an operational condition, (b) a path for said operational condition, and (c) path thresholds for said operational condition as a function of the progress of a transient process.

Methods and systems described herein may display, for one or more operational conditions, a plot or other mathematical representation (e.g., values, a table, or the like) of measured operational conditions, paths for said operational conditions, and/or path thresholds for said operational conditions. FIG. 2 illustrates the three foregoing in an overlay plot. Such a plot is a real-time contextual display for an operator that is monitoring and/or adjusting the operational parameters of transient process. Alternative to FIG. 2, a display may be a plot or other mathematical representation of (a) measured operational conditions and paths for said operational conditions or (b) measured operational conditions and path thresholds for said operational conditions.

Displays related to methods and systems of the present disclosure may include plots like FIG. 2 or similar plot or mathematical representation for one or more (e.g., 1 to 50, or 1 to 15, or 5 to 20, or 10 to 25, or 25 to 50) operational conditions. The plot or mathematical representation for each of the operational conditions do not necessarily have to be the same type of plot or show the same type of data.

Methods and systems described herein may trigger an alarm when a measured operational condition is outside path thresholds for said operational condition. The alarm may be visual and/or audio. Further, with the alarm, the methods and systems of the present disclosure may also provide guidance on how to bring the operational condition back within the path.

Methods and systems described herein may also use the correlations derived from historical data described above and/or the model based on such correlations to update the path and/or the path thresholds during the progress of the transient process. In such instances, the methods and systems described herein are adaptive.

Updates to the path and/or the path thresholds may be triggered by a measured operational condition being outside the present path thresholds, an operator request, a pre-programmed request (e.g., at certain time intervals or at a certain number of vessel cycles), and the like, and any combination thereof.

Figure 3:
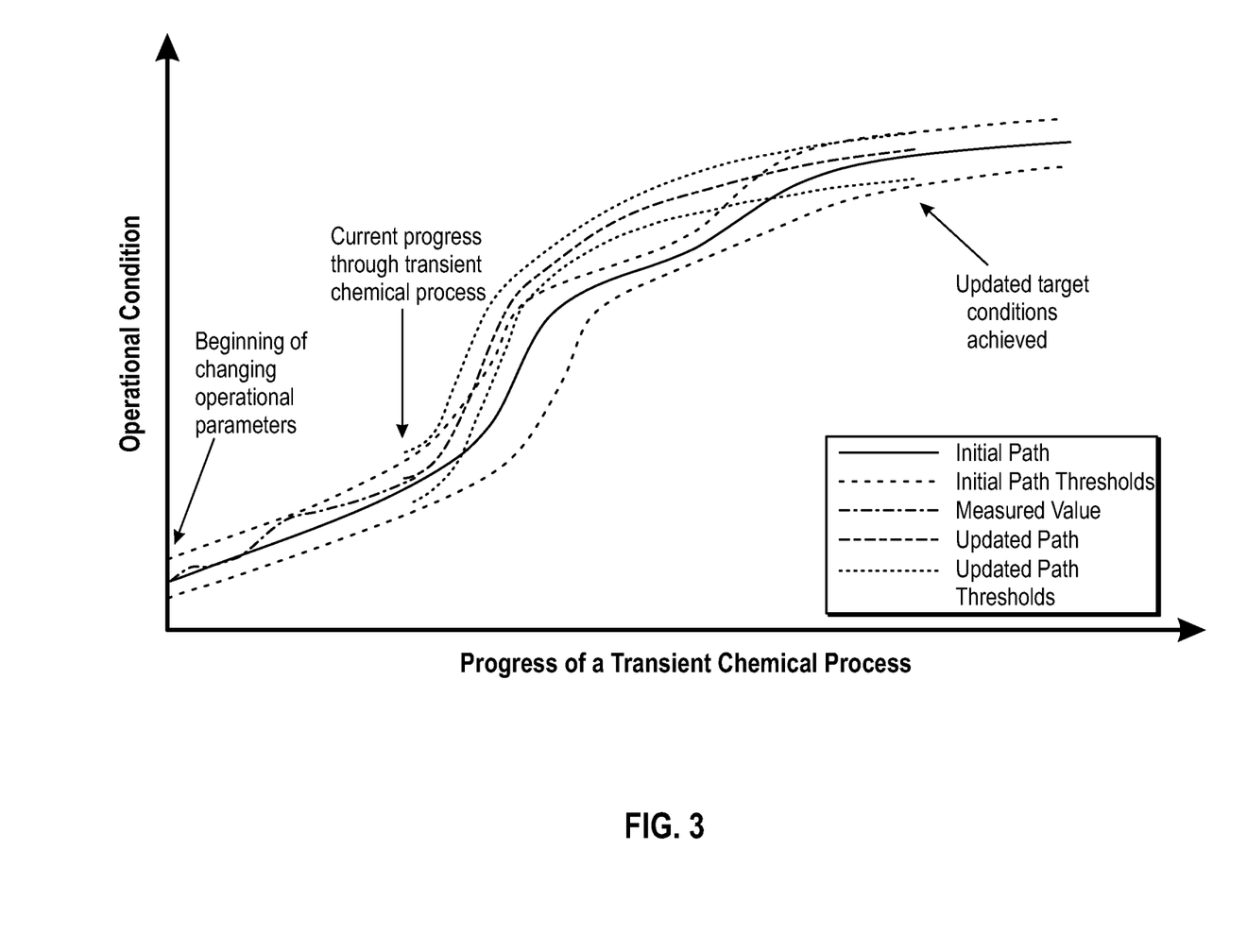
FIG. 3 illustrates the hypothetical plot of the measured operational condition, path for said operational conditions, and path thresholds for said operational condition from FIG. 2 with an updated path and path thresholds.

FIG. 3 illustrates the plot of the measured operational condition, path for said operational conditions, and path thresholds for said operational condition from FIG. 2 with an updated path and path thresholds.

The path and/or the path thresholds may be updated any number of times during the progress of the transient process.

Methods and systems described herein may trigger an alarm when a measured operational condition is outside updated path thresholds for said operational condition. The alarm may be visual and/or audio.

Methods and systems described herein may also use the correlations derived from historical data described above and/or the model based on such correlations to predict a future value of the measured operational condition. The prediction may be based on (a) the correlations and/or model, (b) the current value of the measured operational condition, and/or (c) the past values of the measured operational condition in the present transient process.

Methods and systems described herein may trigger an alarm when a predicted future value for a measured operational condition is outside updated path thresholds for said operational condition. The alarm may be visual and/or audio.

The methods described herein may be performed with the assistance of a computer or other processor-based device.

"Computer-readable medium" or "non-transitory, computer-readable medium," as used herein, refers to any non-transitory storage and/or transmission medium that participates in providing instructions to a processor for execution. Such a medium may include, but is not limited to, non-volatile media and volatile media. Non-volatile media includes, for example, NVRAM, or magnetic or optical disks. Volatile media includes dynamic memory, such as main memory. Common forms of computer-readable media include, for example, a floppy disk, a flexible disk, a hard disk, an array of hard disks, a magnetic tape, or any other magnetic medium, magneto-optical medium, a CD-ROM, a holographic medium, any other optical medium, a RAM, a PROM, and EPROM, a FLASH-EPROM, a solid state medium like a memory card, any other memory chip or cartridge, or any other tangible medium from which a computer can read data or instructions. When the computer-readable media is configured as a database, it is to be understood that the database may be any type of database, such as relational, hierarchical, object-oriented, and/or the like. Accordingly, exemplary embodiments of the present systems and methods may be considered to include a tangible storage medium or tangible distribution medium and prior art-recognized equivalents and successor media, in which the software implementations embodying the present techniques are stored.

The methods described herein can, and in many embodiments must, be performed using computing devices or processor-based devices that include a processor; a memory coupled to the processor; and instructions provided to the memory, wherein the instructions are executable by the processor to perform the methods described herein (such computing or processor-based devices may be referred to generally by the shorthand "computer"). For example, a system may comprise: a processor; a memory coupled to the processor; and instructions provided to the memory, wherein the instructions are executable by the processor to (a) perform the transient process in a reactor using operational parameters; (b) measure the operational condition (or receive operational condition measurements from sensors) of the transient process as a function of the progress of the transient process; and (c) adjust one or more of the operational parameters during the progress of the transient process to maintain the operational condition within path thresholds for the operational condition. Further, the instructions may include the adaptive model for determining and/or adapting the path and path thresholds.

Similarly, any calculation, determination, or analysis recited as part of methods described herein may be carried out in whole or in part using a computer.

Furthermore, the instructions of such computing devices or processor-based devices can be a portion of code on a non-transitory computer readable medium. Any suitable processor-based device may be utilized for implementing all or a portion of embodiments of the present techniques, including without limitation personal computers, networks, personal computers, laptop computers, computer workstations, mobile devices, multi-processor servers or workstations with (or without) shared memory, high performance computers, and the like. Moreover, embodiments may be implemented on application specific integrated circuits (ASICs) or very large scale integrated (VLSI) circuits.

EXAMPLE EMBODIMENTS

A first nonlimiting example embodiment of the present disclosure is a method comprising: providing a path and path thresholds for an operational condition as a function of progress of a transient process based on historical data of previously performed transient processes; performing the transient process in a reactor using operational parameters; measuring the operational condition of the transient process as a function of the progress of the transient process; and adjusting one or more of the operational parameters during the progress of the transient process to maintain the operational condition within the path thresholds. The first nonlimiting example embodiment may include one or more of the following: Element 1: the method further comprising: adjusting the path and the path thresholds during the progress of the transient process based on a real-time value of the measured operational parameter and the historical data; Element 2: the method further comprising: displaying a plot of (a) the measured operational parameter, (b) the path, and (c) the path thresholds each as a function of the progress of the transient process; Element 3: the method further comprising: triggering an alarm when the operational condition is outside the path thresholds; Element 4: the method further comprising: predicting a future value of the operational condition based on a real-time value of the measured operational parameter and the historical data; Element 5: Element 4 and the method of claim 5 further comprising: triggering an alarm when the future value of the operational condition is outside the path thresholds; Element 6: the method further comprising: performing said method for two or more operational parameters of transient process; Element 7: Element 6 and wherein the two or more operation conditions comprises one or more selected from the group consisting of: temperature, pressure, concentration of a chemical, a physical property of a chemical, a dew point, a flow rate, an injection rate of a chemical, a reaction rate, a change or rate of change in any of the foregoing, and any combination thereof; Element 8: wherein the progress of the transient process is time and/or vessel cycles; Element 9: wherein the path thresholds are based, at least in part, on a standard deviation; Element 10: wherein the path thresholds are based, at least in part, on a fixed percentage; Element 11: wherein the transient process is a start-up cycle for the reactor; Element 12: wherein the transient process is a transition cycle for the reactor; and Element 13: wherein the transient process is a steam-air decoking process. Examples of combinations include, but are not limited to, Elements 1 and 2 in combination and optionally in further combination with Element 3; Element 1 and/or Element 2 in combination with Element 4 (and optionally Element 5); two or more of Elements 1-5 in combination; Element 6 (and optionally Element 7) in combination with one or more of Elements 1-5; one or more of Elements 8-10 in combination with one or more of Elements 1-7; two or more of Elements 8-10 in combination; and one of Elements 11-13 in combination with one or more of Elements 1-10.

A second non limiting example embodiment of the present disclosure is a computing device comprising: a processor; a memory coupled to the processor; and instructions provided to the memory, wherein the instructions are executable by the processor to perform the method of the first nonlimiting example embodiment (optionally including one or more of Elements 1-13 including in the foregoing combinations).

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

Examples

Figure 4:
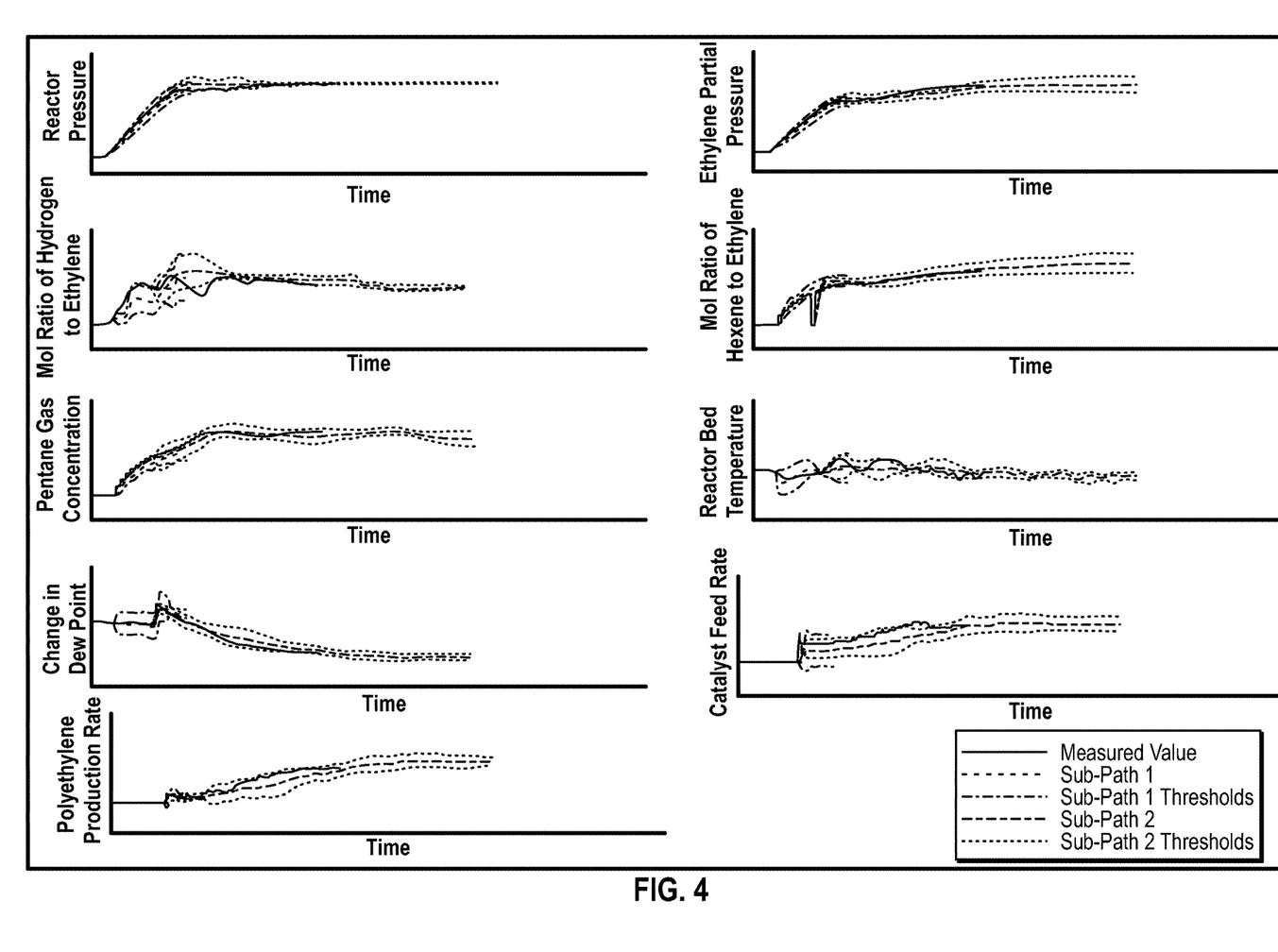
FIG. 4 illustrates the plots for nine operational conditions monitored during a polyethylene synthesis startup.

Example 1. The methods described herein were applied during the startup of a reactor for polyethylene synthesis process. The startup had two stages and corresponding sub-paths with sub-path thresholds. FIG. 4 illustrates the plots for nine operational conditions monitored during the startup. The plots include (a) measurements of an operational condition, (b) a path for said operational condition, and (c) path thresholds for said operational condition as a function of time. The operational conditions monitored were (1) reactor pressure, (2) ethylene partial pressure, (3) mol ratio of hydrogen to ethylene, (4) mol ratio of hexene to ethylene, (5) pentane (diluent) gas concentration, (6) reactor bed temperature, (7) change in dew point, (8) catalyst feed rate, and (9) polyethylene production rate. These plots were displayed for an operator to monitor the operational conditions of the startup process.

In the first stage, the reactor pressure was increased, and gas flow was started. In the second stage, the catalyst was fed to the reactor. The polyethylene synthesis is an exothermic process. Accordingly, when the catalyst feed started, the reactor bed temperature increased. The catalyst feed rate was one of the variables used to control the temperature of the reactor bed. Each of the nine operational conditions monitored mostly stayed within their respective path thresholds. However, initially there was a faster buildup of hydrogen than desired. That is, the mol ratio of hydrogen to ethylene grew too fast and outside the path thresholds. The operator used the readout to troubleshoot the issue and find the source of the excess hydrogen. The dips in the mol ratio of hydrogen to ethylene occurred when the butene flow was stopped. Therefore, the source of the hydrogen was due to hydrogen being in the butene source.

Figure 5:
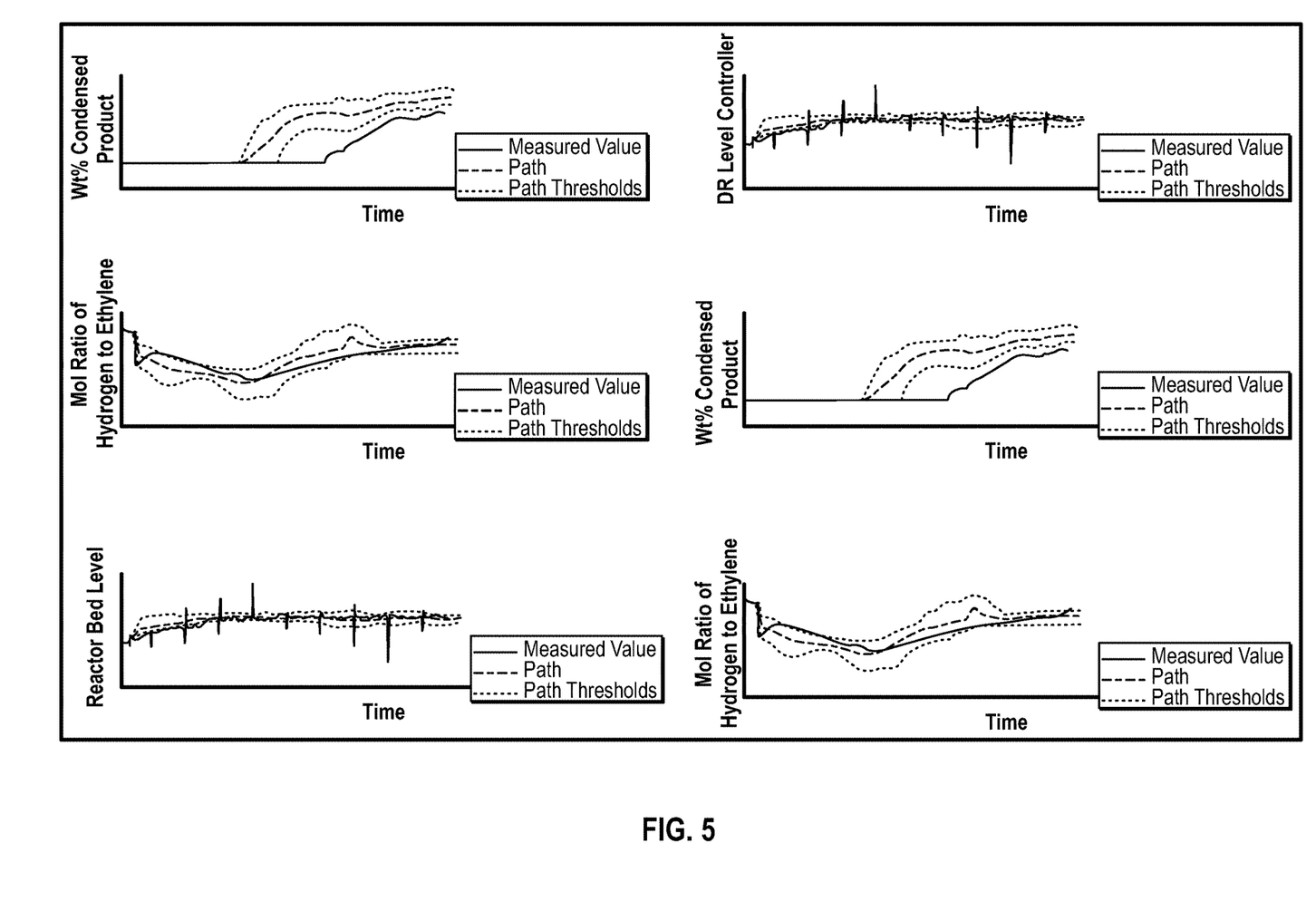
FIG. 5 illustrates the plots for six operational conditions monitored during a polyethylene synthesis startup.

Example 2. The methods described herein were applied during the startup of a reactor for polyethylene synthesis process. FIG. 5 illustrates the plots for six operational conditions monitored during the startup. The plots include (a) measurements of an operational condition, (b) a path for said operational condition, and (c) path thresholds for said operational condition as a function of time. The operational conditions monitored were (1) change in reactor temperature, (2) catalyst feed rate, (3) dew point, (4) weight percent condensed product, (5) reactor bed level, and (6) mol ratio of hydrogen to ethylene. These plots were displayed for an operator to monitor the operational conditions of the startup process.

As illustrated in the change in temperature, the catalyst light off was slow. To correct this, the catalyst was added at rates above the threshold. Then, near the end of the process, a spike in temperature was observed, and the catalyst flow was stopped completely. The polyethylene startup process is prone to failure if the temperature gets too high. Using the methods described herein, the observation of the sudden high change in temperature was able to be corrected in real-time, and the startup was completed.

Example 3. The methods described herein were applied during a steam-air decoking process. Over time, coke builds up in steam cracking coils. Steam-air decoking burns the coke off of the walls of the coils. If temperatures during steam-air decoking of the coils gets to high, the coils can crack.

Figure 6:
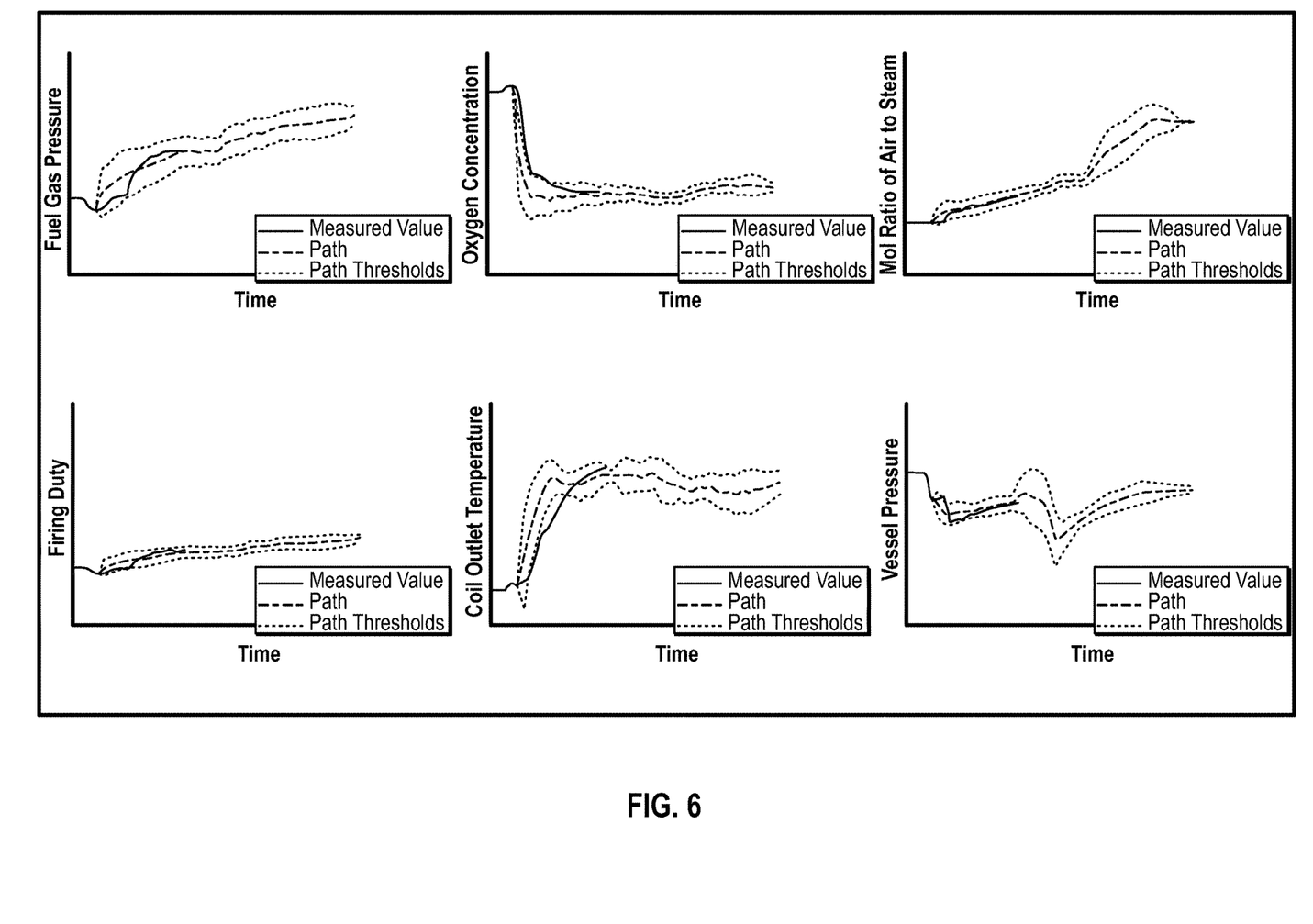
FIG. 6 illustrates the plots for six operational conditions monitored during a steam/air decoking process.

FIG. 6 illustrates the plots for six operational conditions monitored during the steam-air decoking. The plots include (a) measurements of an operational condition, (b) a path for said operational condition, and (c) path thresholds for said operational condition as a function of time. The operational conditions monitored were (1) fuel gas pressure, (2) oxygen concentration, (3) mol ratio of air to steam, (4) firing duty, (5) coil outlet temperature, and (6) vessel pressure. These plots were displayed for an operator to monitor the operational conditions of the process. In this example, the coil outlet temperature increased slower than desired, but rectified and at the time of this snapshot, all operational conditions were within threshold values.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art of having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
providing a path and path thresholds for an operational condition as a function of progress of a transient process based on historical data of previously performed transient processes, wherein the transient process is related to a chemical manufacturing process, a chemical distillation process, a refining process, a petroleum distillation process, a petroleum processing method, or a polymer manufacturing process;
performing the transient process in a reactor using operational parameters;
measuring the operational condition of the transient process as a function of the progress of the transient process;
displaying a plot of each of (a) the measured operational parameter, (b) the path, and (c) the path thresholds, each as a function of the progress of the transient process; and
adjusting one or more of the operational parameters during the progress of the transient process to maintain the operational condition within the path thresholds.

2. The method of claim 1 further comprising:
adjusting the path and the path thresholds during the progress of the transient process based on a real-time value of the measured operational parameter and the historical data.

3. The method of claim 1 further comprising:
triggering an alarm when the operational condition is outside the path thresholds.

4. The method of claim 1 further comprising:
predicting a future value of the operational condition based on a real-time value of the measured operational parameter and the historical data.

5. The method of claim 4 further comprising:
triggering an alarm when the future value of the operational condition is outside the path thresholds.

6. The method of claim 1 further comprising:
performing said method for two or more operational conditions of transient process.

7. The method of claim 6, wherein the two or more operation conditions comprises one or more selected from the group consisting of: temperature, pressure, concentration of a chemical, a physical property of a chemical, a dew point, a flow rate, an injection rate of a chemical, a reaction rate, a change or rate of change in any of the foregoing, and any combination thereof.

8. The method of claim 1, wherein the progress of the transient process is time and/or vessel cycles.

9. The method of claim 1, wherein the path thresholds are based, at least in part, on a standard deviation.

10. The method of claim 1, wherein the path thresholds are based, at least in part, on a fixed percentage.

11. The method of claim 1, wherein the transient process is a start-up cycle for the reactor.

12. The method of claim 1, wherein the transient process is a transition cycle for the reactor.

13. The method of claim 1, wherein the transient process is a steam-air decoking process.

14. A computing device comprising:
a processor;
a memory coupled to the processor; and
instructions provided to the memory, wherein the instructions are executable by the processor to perform the method of claim 1.

* * * * *